United States Patent [19]

Smith

[11] 4,252,676

[45] Feb. 24, 1981

[54] PREPARATION OF COLLOIDAL GROUP VII-A TRANSITION METAL DISPERSIONS BY THE POLYMER-CATALYZED DECOMPOSITION OF CARBONYL AND ORGANOCARBONYL COMPOUNDS THEREOF

[75] Inventor: Thomas W. Smith, Penfield, N.Y.

[73] Assignee: Xerox Corporation, Stamford, Conn.

[21] Appl. No.: 100,309

[22] Filed: Dec. 4, 1979

[51] Int. Cl.$^3$ .......................... B01J 31/02; C08K 3/08
[52] U.S. Cl. ................................ 252/430; 260/42.22; 430/286; 430/945; 568/451; 568/454; 568/455
[58] Field of Search ................. 252/430; 260/604 HF, 260/42.22; 430/945, 286

[56] References Cited

U.S. PATENT DOCUMENTS

| | | | |
|---|---|---|---|
| 3,228,881 | 1/1966 | Thomas | 260/39 M |
| 3,281,344 | 10/1966 | Thomas | 260/42.22 |
| 3,824,221 | 7/1974 | Ragg | 260/604 HF |
| 3,847,997 | 11/1974 | Allen | 260/604 HF |

*Primary Examiner*—John F. Niebling
*Attorney, Agent, or Firm*—H. M. Brownrout; E. O. Palazzo; P. P. Eichler

[57] ABSTRACT

There is disclosed a method for the preparation of a homogeneous, physically stable dispersion of colloidal metal particles of a transition metal selected from the group consisting of manganese and rhenium having a size in the range of from about 10 Angstrom units to about 200 Angstrom units. The method comprises preparing a solution of a functional polymer in an inert solvent, and incrementally adding thereto a transition metal precursor, at a temperature at which the transition metal precursor will become bound to the polymer and thermally decompose to produce elemental transition metal particles, the process being carried out in an inert atmosphere. Such dispersions may be used per se as catalysts, or may be used for the preparation of supported colloidal transition metal catalysts. The dispersions may also be used for the preparation of ablative optical recording media.

38 Claims, No Drawings

PREPARATION OF COLLOIDAL GROUP VII-A TRANSITION METAL DISPERSIONS BY THE POLYMER-CATALYZED DECOMPOSITION OF CARBONYL AND ORGANOCARBONYL COMPOUNDS THEREOF

The present invention relates to a novel method for the preparation of homogeneous colloidal elemental dispersions of a transition metal of group VII-A of the periodic chart of elements selected from the group consisting of manganese (Mn) and rhenium (Re), with the use of a functional polymer in dilute solution in any of a large variety of suitable inert solvents, and with the use of any suitable transition metal precursor. The invention also relates to the homogeneous colloidal elemental transition metal dispersions, to their use as catalysts and for the preparation of supported transition metal catalysts, and to their use as materials for the preparation of ablative optical recording media. The term "transition metal" as used herein refers to a transition metal selected from the group consisting of manganese and rhenium, unless otherwise stated.

In general, the preparation of the homogeneous colloidal elemental transition metal dispersions of the invention involves the thermal decomposition of a suitable transition metal precursor in a relatively dilute solution of a functional polymer in an inert solvent for the transition metal precursor and the polymer, the reaction being carried out in an inert atmosphere, with the thermal decomposition of the transition metal precursor occurring primarily with the precursor bound to the functional polymer. The functional polymer can react with the transition metal precursor in either an "active" or "passive" fashion; i.e., it may react directly and spontaneously with the transition metal precursor, without the prior loss of any ligand (active); it may react with the transition metal precursor only after it has lost at least one ligand (passive); or both processes may occur simultaneously. The term "functional polymer" includes both "active" and "passive" polymers. Whether the reaction proceeds actively or passively or both simultaneously depends upon the particular precursor and polymer employed. The term "passive polymer" refers generally to polymer molecules substantially each of which contains at least one reactive binding site for the transition metal precursor at which sites the transition metal precursor molecules react to produce polymer-bound transition metal precursor. Such passive polymers are to be distinguished from "active polymers" in that systems for the preparation of colloidal transition metal dispersions employing a passive polymer in solution require sufficient heat or other stimulus to remove at least one ligand from the transition metal precursor molecule before the transition metal precursor can become bound to the polymer; that is, the transition metal precursor molecules cannot react directly and spontaneously with the binding sites of the passive polymer, but only after loss of one or more ligands. Active polymers do not require such a prior loss of ligands, and the precursor reacts directly and spontaneously with their reactive binding sites. Preferably, the appropriate amount of the desired functional polymer is dissolved in the appropriate amount of the desired inert solvent, and the solution is heated to the appropriate reaction temperature at which thermal decomposition of the polymer-bound transition metal precursor will occur, whereupon the appropriate amount of the desired transition metal precursor is added in appropriate increments and binds to the polymer. This incremental addition is continued until the appropriate total amount of transition metal precursor has been added and permitted to thermally decompose.

Depending upon the choice of inert solvent, polymer, precursor, and the preparative conditions, homogeneous colloidal transition metal dispersions of the invention may contain colloidal transition metal particles having an overall size range of from about 10 Angstrom units to about 200 Angstrom units. Usually, however, the materials and conditions are selected such that any given dispersion produced will inherently have a relatively narrow particle size range within the overall range of from about 10 Angstrom units to about 200 Angstrom units, the materials and conditions being selected to produce a particle size range suitable for the intended end use of the dispersion. As a practical upper limit, the particle size is typically about 200 Angstrom units, since colloidal transition metal dispersions according to the invention having such a maximum particle size are typically very physically stable; that is, they do not settle in periods of years. If the particle size substantially exceeds about 200 Angstrom units, the dispersions tend to lack physical stability and may flocculate. The minimum particle size observed is about 10 Angstrom units. The maximum particle size observed is about 200 Angstrom units. Dispersions having a maximum particle size of about 150 Angstrom units have the best physical stability. The colloidal transition metal dispersions according to the invention are also very chemically stable if kept in an inert environment such as argon. Extensive oxidation of the transition metal particles may occur readily in the presence of oxygen.

Considering the possible catalytic utilities of the colloidal transition metal dispersions of the instant invention, it is known that the catalytic activity of colloidal transition metal particles is usually inversely proportional to the size of the particles. Accordingly, the most efficient particle size for catalytic use may be in the minimum size range. There are, however, two features of the use of dispersions of this invention as catalysts which outweigh simple considerations of particle size in the efficiency of the catalyst. This invention provides a method for the preparation of discrete colloidal particles of controlled narrow particle size distribution. These dispersions can subsequently be immobilized in an appropriate solid phase to yield a solid catalyst which contains a high loading of colloidal catalytic particles. In processes where the colloidal particles are generated in situ, i.e., on the support, by reduction of adsorbed ions, high percentages of catalyst loading cannot be achieved while maintaining a small particle size and a narrow particle size distribution. The most important feature of the catalytic activity of the dispersions of this invention is the role of the polymer bound to the particles' surfaces. In the presence of reducing or oxidizing gases, the functional sites on the polymer can react with the transition metal atoms to generate the active catalytic species in a liquidous layer surrounding the particle. Reactions which may be catalyzed by the colloidal transition metals of the invention include double bond isomerization.

For the preparation of ablative optical recording media, it is preferred generally to maximize the particle size up to about 200 Angstrom units; it is also desirable to maximize the ratio of colloidal transition metal to the polymer, which may be accomplished by minimizing the amount of polymer and maximizing the amount of transition metal precursor during the incremental addition of the precursor. The basic reason for this is to maximize the light absorptivity of the films cast from the dispersions. Ablative optical recording media which may be prepared from colloidal transition metal dispersions according to the instant invention are described in copending U.S. patent application Ser. No. 054,204, filed July 2, 1979, entitled "Optical Disk", which application is assigned to the assignee of the instant application. The colloidal elemental transition metal dispersions of the present invention may be used directly for the preparation of ablative optical recording disks by spin coating the dispersion onto any suitable substrate, it being possible to control the thickness of the film coating by varying the spinning rate. Further details are set forth in the aforementioned copending U.S. patent application.

Considering the method of producing homogeneous colloidal transition metal dispersions according to the invention in greater detail, a suitable solvent is required which will dissolve the functional polymer and the transition metal precursor, and the transition metal precursor becomes bound to the reactive sites of the polymer. The bound metal precursor tends to decompose to metal at a rate which is greatly in excess of the rate of any decomposition of unbound transition metal precursor molecules.

Considering suitable functional polymers in greater detail, it has already been indicated that a suitable polymer is any polymer which contains one or more reactive binding sites which will react with the transition metal precursor molecules to yield polymer-bound transition metal precursor molecules. It is highly preferred that this binding occur much more rapidly than any substantial decomposition to metallic transition metal of unbound precursor molecules remaining dissolved in the solvent. It is also highly preferred that the polymer-bound transition metal precursor decomposes at a much more rapid rate than the unbound transition metal precursor. This insures that the transition metal particles will be generated primarily in the domain of the polymer molecules.

The ratio of polymer to solvent employed is important. The concentration of the polymer must be below the critical entanglement concentration for the polymer molecules in solution, that is, each polymer molecule constitutes a discrete entity. Each such discrete polymer molecule may be referred to as an isolated domain. The lower the molecular weight of the polymer, the higher the critical entanglement concentration for the polymer, thus the greater the amount of polymer which can be used for a given volume of solvent.

As will be seen from the examples which follow, the transition metal precursor is preferably added in increments, so that a predetermined excess of dissolved unbound transition metal precursor is present in solution. The mechanism and general sequence of events in the reaction mixture is somewhat as follows. When a relatively small increment of transition metal precursor is added to a solution of the polymer at an appropriate temperature, the polymer first serves as a reactant, and the transition metal precursor molecules become bound to the binding sites of the polymer. This reaction preceeds nucleation, wherein a particle nucleus is formed which may either be a transition metal or some more complex transition metal-containing species. Thus, at the outset of the entire sequence of events, the functional polymer is a catalyst for the generation of transition metal particle nuclei or transition metal-containing particle nuclei, which are bound to the reactive sites of the polymer. At this point, the polymer has served its catalytic role for the nucleation of particles, and the reaction vessel contains randomly dispersed colloidal nuclei of a metal or metal-containing particles bound to the reactive sites of the polymer. At nucleation, the decomposition becomes dominated by a new process, viz., disproportionation of transition metal precursor at the surfaces of the nuclei. The polymer stabilizes the nascent (growing) particles in the same domains in which the particles were nucleated, that is, collisional growth of the nascent particles is minimized. The principal role of the polymer now becomes stabilization of the newly formed colloidal transition metal dispersion. Now the reaction merely enlarges the particles as more transition metal precursor is added incrementally and reacts at the surface of the polymer-bound particles. There is a distinct transformation from the particle nucleation stage to the particle growth stage, evidenced by a dramatic change in the rate of evolution of carbon monoxide.

The number of polymer molecules, i.e., discrete polymer molecule domains, is directly proportional to the number of transition metal particles and inversely proportional to the particle size at any given volume of metal.

Suitable functional polymers must, of course, be soluble in the solvent selected, preferably at about ambient temperature or slightly above for convenience, but in any event, necessarily at the temperature at which the transition metal precursor binding and precursor decomposition occur to produce colloidal transition metal particles. There are a number of functional polymers which may be used in the method of the instant invention. Such would include polymers bearing groups which non-oxidatively substitute transition metal carbonyls. Typical polymers of this type are vinyl polymers containing alkenyl, phosphine, arsine, isonitrile and isocyanate groups. Typical examples of such polymers are copolymers of (1) styrene, ethylene, or derivatives thereof, with (2) butadiene, isoprene, cyclopentadiene, and isopropenylisocyanate. Numerous other polymers may be used in the method of the instant invention. Such would include polymers bearing nucleophilic atoms or groups in the backbone or appendant thereto, such as Lewis bases. One specific class of useful Lewis bases are polymers which contain nitrogen having a free non-bonding electron pair, these being termed, for convenience, nitrogen-containing Lewis bases. Typical polymers of this type are vinyl polymers containing amine, amide, nitrile, oxime or imine groups. Typical examples of nitrogen-containing Lewis base polymers are copolymers of (1) styrene, ethylene, butadiene, or derivatives thereof, with (2) acrylonitrile, acrylamide, N,N-dialkylacrylamides, and vinylamine. Other Lewis bases which may not be of the nitrogen-containing nucleophilic type, but which are useful, are Lewis bases containing oxygen, phosphorous or sulfur. Typical of such other nucleophilic Lewis base polymers are polymers containing amine oxide, phosphine, phosphine oxide, or sulfoxide residues. Specific examples of such materials are copolymers of para-styryldiphenylphosphine, para-styryldiphenylphosphine oxide, or vinylpyridine-N-oxide with styrene, and poly(-phenylenesulfoxide).

Turning now to a consideration of suitable transition metal precursors, of which there are many, such are labile transition metal carbonyl and organocarbonyl compounds. In referring to such compounds, the term "labile" as used herein is intended to signify that the transition metal in the compound is attached to a ligand or ligands which will readily become dissociated from the molecule to leave the elemental transition metal. An important feature of the labile transition metal precursor is the mixture of its labile ligands. It is highly preferred that the ligands be volatile or otherwise easily removable from the reaction mixture. It is essential that the ligands do not interfere with or adversely affect the decomposition process and the stability of the resultant dispersion. Specific classes of such compounds include transition metal carbonyls, transition metal alkylcarbonyls, and transition metal alkenylcarbonyls. Exemplary of the transition metal carbonyls are dimanganesedecacarbonyl and dirheniumdecacarbonyl. Examples of the transition metal alkylcarbonyls are methylmanganesepentacarbonyl and methylrheniumpentacarbonyl. Examples of the transition metal alkenylcarbonyls are methylcyclopentadienylmanganestricarbonyl (which is particularly readily commerically available at low cost, thus especially preferred as a precursor), cyclopentadienylmanganesetricarbonyl, and cyclopentadienylrheniumtricarbonyl. All of the above compounds are either commercially available or may be prepared by methods disclosed in the literature.

If the selected transition metal precursor is a liquid, it can be added directly to the reaction mixture in the appropriate increments. If the precursor is a solid, it may first be dissolved in a small amount of a suitable solvent for incremental addition, or it may be added as a powder with, for example, a powder dosing funnel.

As has been mentioned, and as will be seen from the examples, the transition metal precursor should be added incrementally at suitable time intervals. As already indicated, the reason for this incremental addition is that two separate reactions can occur simultaneously. First, if too much transition metal precursor is added, some of it remains in solution, where it can decompose slowly to metal. Decomposition of the unbound transition metal precursor is undesirable and should be minimized. Second, the preferred reaction is the decomposition of the polymer-bound transition metal species, and the incremental addition and the rate thereof should be adapted to favor this reaction.

As a minimum first increment of transition metal precursor, an amount of precursor may initially be added which is just enough to saturate all of the reactive binding sites on the polymer. However, it is preferred to add an excess of precursor up to about 5 to about 10 moles of transition metal precursor per mole of reactive sites, this preference existing because the excess unbound precursor does not decompose to metallic transition metal very readily compared to the polymer-bound precursor, and the excess is desirable to be readily available to react at the sites at which decomposition reaction has occurred, to facilitate nucleation and particle growth.

The subsequent increments are added based upon monitoring the evolution of carbon monoxide which occurs as a result of the decomposition of the transition metal precursor. When little carbon monoxide is being generated from the reaction mixture, it is apparent that the precursor present in the reaction mixture has substantially decomposed. Thus, it is desirable to wait until only a little or no carbon monoxide is being generated, then add another increment of up to about 5 to about 10 moles excess, and so on, until the addition of the final increment. Typically, it has been found that it is desirable to wait for a period of about 2 to about 4 hours between increments, depending upon the reaction rate, which is a function of the reagents, solvent, temperature and other conditions.

After the last increment has been added, it is generally convenient to continue heating, for example, for about 24 hours to evolve the last traces of carbon monoxide, indicating substantially total completion of the desired reaction. Of course, it is possible to add increments less frequently than indicated above. On a production basis, it would be preferred to add the transition metal precursor continuously at a rate determined to be sufficient to compensate for the consumption of the transition metal precursor in the reaction vessel; this would be the equivalent of a continuous incremental addition.

The maximum amount of transition metal precursor which can effectively be added to the dispersion is determined experimentally by the point at which the total transition metal concentration in the dispersion can no longer be increased significantly. Immediately following particle nucleation, the particle size is at a minimum in any given system. One can discontinue adding additional precursor when the desired particle size has been achieved. If the aforementioned maximum amount of precursor is exceeded, undesirable results such as a wider particle size range and precipitation of the colloidal dispersion ensue.

Turning now to a consideration of solvents which are suitable for preparing the colloidal dispersions of the instant invention, suitable solvents must be inert in the sense that they react neither with the transition metal precursor, the polymer, nor the resulting transition metal dispersion. The solvent must be capable of dissolving the polymer, preferably at about ambient temperature or slightly above for convenience, and necessarily at the reaction temperature. It should likewise be a good solvent for the transition metal precursor, preferably at about ambient temperature, and necessarily at the reaction temperature. Thus, practically speaking, the choice of a suitable solvent depends upon the transition metal precursor employed and the polymer employed, with due regard to the solubility and reactivity of these materials. A wide variety of inert solvents may be employed. Some solvents which have been found to be particularly useful include the following: (1) benzene and alkyl derivatives thereof such as monoalkylbenzenes and dialkylbenzenes; (2) halogenated derivatives of benzene such as chlorobenzene, o-dichlorobenzene, and p-dichlorobenzene; (3) straight chain and cyclic hydrocarbons, and particularly alkanes having from about 5 to about 20 carbon atoms, either straight chain or branched, such as decane, octane, hexadecane, pentane, isooctane and neopentane, and cyclic alkanes such as cyclohexane, decalin and tetralin; (4) ethers and alcohols such as tetrahydrofuran, dialkyl ethers, ethyleneglycolmonomethylether, ethyleneglycolmonoethylether, butanol, hexanol and cyclohexanol; (5) esters such as alkylacetates, alkylpropionates and alkylbutyrates; and (6) ketones such as cyclohexanone, mesityl oxide, etc.

There is no particular upper limit on the boiling point of the solvent selected, but there is a practical lower limit, that being the temperature at which thermal decomposition of the polymer-bound transition metal precursor will proceed at the pressure employed. Concerning the melting point of the solvent, it must be a liquid at the reaction temperature of the thermal decomposition of the polymer-bound transition metal precursor, and it should preferably be liquid at ambient temperature or slightly above ambient temperature to facilitate making the reaction mixture and subsequent processing of the resulting dispersion after the reaction is complete.

The amount of solvent to be employed depends primarily upon the polymer which is selected, and more particularly, upon the molecular weight thereof, bearing in mind that the concentration of the polymer in the solvent solution must be below the critical entanglement concentration for the polymer molecules, so that each polymer molecule is a discrete, individual, isolated domain, not entangled with any other polymer molecules. As a practical matter, the lowest molecular weight polymer which would ordinarily be used would have a molecular weight of about 1,000, so as to be capable of forming sizable discrete domains. With such a low molecular weight polymer, it is possible to use about 10 percent or more by weight of polymer based upon the weight of the solvent, based upon the critical entanglement concentration. Of course, one may use more solvent than the required minimum, if desired. As a practical matter, the maximum molecular weight of the polymer which may ordinarily be used is about 1 million, and with such a high molecular weight polymer, a maximum polymer concentration of about 0.5 percent by weight based upon the weight of the solvent may be used; typically, with such high molecular weight polymers, the polymer concentration which is generally preferred may range from about 0.2 percent to about 0.5 percent by weight based upon the weight of the solvent, again, the limit being based upon the critical entanglement concentration. The molecular weight of the polymer which is selected is chosen primarily with regard to the size of the colloidal transition metal particles desired; the higher concentrations of lower molecular weight range polymers will produce relatively small particles, whereas lower concentrations of higher molecular weight polymers will tend to yield larger colloidal particles. Typically, the molecular weight of the polymers ranges from about 10,000 to about 100,000, in which case the typical concentration of the polymer in the solvent ranges, respectively, from about 5 percent down to about 2 percent by weight based upon the weight of the solvent.

Concerning the reaction temperature, the solution of functional polymer and transition metal precursor is heated at a temperature at which the polymer-bound transition metal precursor decomposes to the metal at a much more rapid rate than any unbound free precursor which may be in the solution decomposes to transition metal. In practice, a suitable temperature range is from about 100° C. to about 200° C. for most systems, and the preferred temperature range for most systems is from about 140° C. to about 180° C. The optimal temperature for any given system may readily be determined simply by monitoring the rate of carbon monoxide evolution from the system. Excessive temperatures may result in an uncontrolled reaction and undesirable precipitation of transition metal particles of a micron or greater. Prior to nucleation, the rate of carbon monoxide evolution in the presence of the functional polymer is comparable to that in the absence of polymer. However, after nucleation, the rate of decomposition at the surface of the particles is much faster than that in solution. It is generally preferable to use the minimum temperature that will give a significant rate of decomposition of the polymer-bound transition metal precursor to the metal, since this also tends to minimize solution phase decomposition. The optimum temperature varies with the system and, as mentioned, is best simply determined experimentally. It is generally preferred to conduct the reaction at atmospheric pressure for convenience, although the reaction will proceed at a pressure above or below atmospheric pressure, which would, in turn, influence the boiling point of the selected solvent. The solvent, of course, must have a boiling point which is at least as high as the desired reaction temperature at the pressure employed. It is useful to select a solvent having a boiling point, at the pressure employed, such that the reaction may be carried out at reflux temperature, this being useful in that it assists the evolution of carbon monoxide. However, it is possible to operate at temperatures below reflux temperature.

As mentioned, the reaction should be carried out in an inert atmosphere, that is, inert in the sense that the atmosphere does not cause any adverse reactions in the system, either with respect to the solvent, the polymer, the precursor or the product. While argon is conveniently used in the examples which follow, other inert atmospheres may be employed such as nitrogen, neon and helium, or the reaction may be carrier out in a vacuum with sufficiently high boiling solvents and precursors.

It is to be particularly noted that the polymer is both a reactant and a catalyst for the decomposition of the transition metal precursor; it is not an inactive component which merely serves to stabilize independently nucleated particles.

The following examples are intended to illustrate, and not to limit, the scope of the instant invention.

EXAMPLE I

This example illustrates the preparation of a colloidal dispersion of manganese particles prepared with a hydroxyl-terminated copoly(styrene/butadiene) (0.25/0.75)molar as the functional polymer.

20.0 g. of the aforementioned functional polymer is dissolved in 500 g. of diethyleneglycoldimethylether at ambient temperature (about 25° C.) in a 1 liter 4-neck round bottom flask. This represents a 3.85 weight percent polymer solution. The flask is equipped with a paddle stirrer, a thermometer long enough to have its bulb immersed in the liquid, a reflux condenser, and a combined gas inlet and rubber serum cap for introducing an inert atmosphere and reactants and to permit sampling the reaction mixture with a hypodermic syringe and needle. The reflux condenser is vented to the atmosphere through a drying tube containing a dessicant. The lower portion of the flask is immersed in a mineral oil bath as a heat source.

In preparation for the introduction of the precursor, dimanganesedecacarbonyl, the solution in the flask is heated to 150° C. and the system is thoroughly purged with argon overnight for about 16 hours with the temperature being maintained at 150° C. 142.0 g. of the precursor dissolved in 50 g. of diethyleneglycoldimethylether is added in twenty equal increments, generally maintaining a continuing argon flow and constant stirring. The increments are added every 2.5 hours. The progress of the reaction and the formation of polymer liganded metal carbonyl intermediates is followed by taking periodic infrared spectra of samples removed from the reaction mixture. After adding the last increment, heating is continued for about 24 hours until the precursor has been completely decomposed, as conveniently determined by the absence of carbonyl bands near 2,000 cm$^{-1}$ in the infrared spectrum of the dispersion. The dispersion is cooled to room temperature, and, under an inert atmosphere of argon, the dispersion is filtered to remove any large particles of manganese or precipitated polymers, that is, anything flocculent. The filtration is carried out under pressure through a pad filter having pores of 2–4 microns and the filtrate is then bottled under argon in serum bottles for retention and further testing. The dispersion contains 6.6% manganese by weight and 3.5% polymer by weight, the manganese particles being bound to the polymer molecules. The dispersion is comprised of manganese particles ranging from about 50–100 Angstrom units in diameter.

The instant invention provides a method for the preparation of a homogeneous, physically stable colloidal elemental transition metal dispersion, suitable for use as a catalyst, comprising colloidal transition metal particles having a particle size within the range of from about 10 Angstrom units to about 200 Angstrom units dispersed in an inert liquid and stabilized by the presence of a functional polymer to the reactive sites of which the transition metal particles are bound.

EXAMPLE II

This example illustrates the preparation of a colloidal dispersion of rhenium particles using copoly(styrene/-parastyryldiphenylphosphine)(9.3/0.7)molar as the functional polymer.

Example I is repeated, the only significant differences being that (1) 4.0 g. of the above-mentioned functional polymer is substituted for the 20.0 g. of the polymer employed in Example I; (2) only 250 g. of the inert solvent is used; and (3) 30.0 g. of dimanganesedecacarbonyl as the precursor dissolved in 2.5 g. of diethyleneglycoldimethyether is added in 20 equal increments. The resulting dispersion contains 5.5 percent manganese by weight and 1.3 percent polymer by weight, the manganese particles being bound to the polymer molecules. The dispersion comprises manganese particles ranging from about 50-120 Angstrom units.

EXAMPLE III

This example illustrates the preparation of a colloidal dispersion of manganese particles prepared with copoly(styrene/4-vinylpyridine)(1/0.1)molar as the functional polymer.

The general apparatus and procedure of Example I are employed in this example. 41 g. of methylcyclopentadienyltricarbonyl precursor is added to a solution of 2.44 g. of copoly(styrene/4-vinylpyridine)(1/0.1)molar having a styrene equivalent number average molecular weight of about 10,000 dissolved in 250 g. of diethyleneglycoldimethylether (representing a 0.97 weight percent polymer solution) in ten 4.1 g. increments, with 2.5 hour intervals between the addition of each increment. The temperature of the solution is 155° C. Following additon of the last increment, the heating is continued for about 24 hours until the precursor has been completely decomposed, as conveniently determined by the absence of carbonyl bands near 2,000 cm$^{-1}$ in the infrared spectrum of the resultant dispersion. The resulting dispersion contains 3.5 weight percent manganese and 1.0 weight percent polymer. The particle size of the colloidal manganese in the dispersion ranges from about 80 to about 130 Angstrom units in diameter.

EXAMPLE IV

This example illustrates the use of actinic radiation to effect the binding of a transition metal precursor to the functional polymer, preliminary to the thermal decomposition of the bound transition metal precursor to an elemental transition metal.

20 g. of the same functional polymer used in Example I is dissolved in 500 g. of diethyleneglycoldimethylether, and the atmosphere is purged with argon, the argon atmosphere being thereafter maintained. 9.6 g. of a solution of 142.0 g. of dimanganese decacarbonyl in 50 g. of diethyleneglycoldimethylether is added to the polymer solution. The mixture is photolyzed for 10 minutes with a high pressure ultraviolet lamp, which effects the binding of manganese carbonyl residues on the polymer. This resulting solution is then charged under an argon atmosphere to a reaction vessel as described in Example I, and the remainder of the precursor solution is added in nineteen equal increments under essentially the same conditions as in Example I. After adding the last increment, heating is continued for about 24 hours until the precursor has been completely decomposed. The resulting dispersion is cooled to room temperature, and, under an inert atmosphere of argon, the dispersion is filtered to remove any large particles of anything flocculent. The filtration is carried out under pressure through a pad filter having pores of 2–4 microns and the filtrate is then bottled under argon in serum bottles for rentention and further testing. The resultant dispersion contains 6.2 percent by weight of manganese and 3.2 percent polymer by weight. The dispersion comprises manganese particles ranging from about 50-120 Angstrom units in diameter.

Depending upon the amounts of polymer and precursor employed, colloidal transition metal dispersions according to the invention, with the transition metal particles bound to the polymer molecules, may be prepared having a weight ratio of transition metal to polymer within the range of from about 10:100 to about 90:10.

Although the invention has been described herein with reference to various preferred embodiments, it is to be understood that variations and modifications may be resorted to as will be apparent to those skilled in the art. Such variations and modifications are to be considered within the purview and the scope of the claims appended hereto.

For example, it is usual to add the polymer to the solvent and dissolve it as the first step, at room temperature, or at some higher temperature which may be as high as the temperature at which the reaction is to occur. However, this procedure could be varied, for example, by adding the first increment of the precursor to the solvent first, and then dissolving the polymer in the solvent, subsequently heating to the reaction temperature. It is also possible, during the reaction, to add more polymer to provide additional reactive sites to increase the number of metal particles in the system. Also, additional polymer, over and above the earlier-mentioned approximately 10 percent or more maximum, may be added at the end of the reaction to enhance the stability of the dispersion, depending upon the intended purpose for the dispersion. It may be preferred to use two different polymers, one being inert and the other being reactive; the inert polymer would typically, but not necessarily, be added after nucleation, and serves to enhance the stability of the resulting dispersion. One may, of course, use a plurality of transitional metal precursors, suitably adjusting the conditions. If it is planned to conduct a continued series of reactions using the same materials, it is possible to make a master nucleated batch of polymer-bound transition metal precursor for subsequent use as desired.

As another possible variation, the decomposition of the polymer-bound transition metal precursor, while preferably and most conveniently effected by heat, may also be effected by other stimuli such as actinic radiation. Also, actinic radiation may be used to effect loss of one or more ligands from the transition metal precursor, at ambient temperature or below, thus enabling the binding of the precursor to the reaction sites, as illustrated in Example IV.

Referring to the examples, most of the polymers used as copolymers, but while this is preferable, it is not essential. Any suitable homopolymer containing reactive sites may be used. Preferably, however, it is desirable to copolymerize the monomer containing the binding moiety with an inert monomer, so that the inert moieties in the polymer chain reduce the number of binding sites in the entire chain, the polymer thus containing moieties having some reactive sites and also moieties not containing reactive sites. Desirably, the inert monomer is selected from the group consisting of styrene, ethylene, methylmethacrylate and vinylacetate and the comonomer containing the binding moiety is selected from the group consisting of butadiene, isoprene, cyclopentadiene, para-styryldiphenylphosphine, isopropenylisocyanate, 2-vinylpyridine, 4-vinylpyridine, N-vinylamidazole, (4,(5)-vinylamidazole, acrylonitrile, methacrylonitrile, N-vinylphthalimide, N,N-dimethylaminoethylmethacrylate, and N-alkylacrylamides.

The colloidal transition metal dispersions, if stored, should be stored under an inert atmosphere to prevent oxidation of the transition metal particles and/or other undesirable reactions.

What is claimed is:

1. A method for the preparation of a homogeneous, physically stable coloidal elemental dispersion of a transition metal selected from the group consisting of manganese and rhenium, comprising:
   (a) preparing a solution in an inert solvent of a functional polymer, the concentration of the polymer being below its critical entanglement concentration, to provide discrete reactive binding sites to which transition metal precursor molecules can become bound;
   (b) incrementally adding, at suitable time intervals, a labile transition metal precursor, the molecules of which rapidly become bound to the reactive sites of the polymer;
   (c) maintaining a temperature which is sufficiently high to decompose the polymer-bound transition metal precursor much more rapidly than any transition metal precursor which may remain unbound in the solution decomposes to metal;
   (d) continuing the addition of increments of transition metal precursor to yield colloidal transition metal particles of the desired size within the range of from about 10 Angstrom units to about 200 Angstrom units, the transition metal particles being bound to the polymer molecules; and
   (e) steps (b), (c) and (d) being carried out in an inert atmosphere.

2. A method as set forth in claim 1 wherein the transition metal is manganese.

3. A method as set forth in claim 1 wherein the transition metal is rhenium.

4. A method as set forth in claim 1 wherein the final increment, after decomposition, yields colloidal transition metal particles having a maximum size of about 150 Angstrom units.

5. A method as set forth in claim 1 wherein the transition metal precursor increments are added in an amount of from about 5 to about 10 moles of transition metal precursor per mole of reactive binding sites.

6. A method as set forth in claim 1 wherein the transition metal precursor increments are added when only a little or no carbon monooxide is being generated.

7. A method as set forth in claim 1 wherein the transition metal precursor increments are added from about 2 to about 4 hours apart.

8. A method as set forth in claim 1 which is carried out at about atmospheric pressure.

9. A method as set forth in claim 1 wherein the addition of the transition metal precursor is continuous, at a rate sufficient to compensate for the consumption of the transition metal precursor already added.

10. A method as set forth in claim 1 wherein the sufficiently high temperature is reflux temperature.

11. A method as set forth in claim 1 wherein the sufficiently high temperature is within the range of from about 100° C. to about 200° C.

12. A method as set forth in claim 11 wherein the temperature is within the range of from about 140° C. to about 180° C.

13. A method as set forth in claim 1 wherein the sufficiently high temperature is the minimum temperature that will cause a significant rate of decomposition of the polymer-bound transition metal precursor.

14. A method as set forth in claim 1 wherein decomposition of the polymer-bound transition metal precursor to the transition metal is effected by actinic radiation instead of heat.

15. A method as set forth in claim 1 wherein the binding of the transition metal precursor to the functional polymer is effected by actinic radiation.

16. A method as set forth in claim 1 wherein additional polymer is added during the reaction.

17. A method as set forth in claim 1 wherein additional polymer is added after the reaction is complete.

18. A method as set forth in claim 1 wherein the functional polymer is soluble in the inert solvent at about ambient temperature.

19. A method as set forth in claim 1 wherein the functional polymer is a homopolymer.

20. A method as set forth in claim 1 wherein the functional polymer is a copolymer of a reactive monomer and an inert monomer.

21. A method as set forth in claim 20 wherein said copolymer is prepared by polymerization of vinyl type monomers.

22. A method as set forth in claim 20 wherein the inert monomer is selected from the group consisting of styrene, ethylene, methylmethacrylate and vinylacetate and the reactive monomer is selected from the group consisting of butadiene, isoprene, cyclopentadiene, para-styryldiphenylphosphine, isopropenylisocyanate, 2-vinylpyridine, 4-vinylpyridine, N-vinylamidazole, 4,(5)-vinylamidazole, acrylonitrile, methacrylonitrile, N-vinylphthalimide, N,N-dimethylaminoethylmethacrylate, and N-alkylacrylamides.

23. A method as set forth in claim 1 wherein said functional polymer has a molecular weight of from about 1000 to about 1 million.

24. A method as set forth in claim 23 wherein the functional polymer concentration in the solution is, respectively, from about 10 percent or more to about 0.2–0.5 percent by weight based upon the weight of the solvent.

25. A method as set forth in claim 1 wherein said functional polymer has a molecular weight of from about 10,000 to about 100,000.

26. A method as set forth in claim 25 wherein the functional polymer concentration in the solution is, respectively, from about 5 percent to about 2 percent by weight based upon the weight of the solvent.

27. A method as set forth in claim 1 wherein said inert solvent is a liquid at about ambient temperature.

28. A method as set forth in claim 1 wherein said transition metal precursor is a transition metal carbonyl.

29. A method as set forth in claim 28 wherein said transition metal carbonyl is dimanganesedecacarbonyl.

30. A method as set forth in claim 28 wherein said transition metal carbonyl is dirheniumdecacarbonyl.

31. A method as set forth in claim 1 wherein said transition metal precursor is a transition metal alkylcarbonyl.

32. A method as set forth in claim 1 wherein said transition metal precursor is a transition metal alkenylcarbonyl.

33. A method as set forth in claim 32 wherein said transition metal alkenylcarbonyl is methylcyclopentadienylmanganesetricarbonyl.

34. A homogeneous, physically stable colloidal elemental dispersion of a transition metal selected from the group consisting of manganese and rhenium, suitable for use as a catalyst, comprising colloidal transition metal particles having a particle size within the range of from about 10 Angstrom units to about 200 Angstrom units dispersed in an inert liquid and stabilized by the presence of a functional polymer to the reactive sites of which the transition metal particles are bound, said dispersion being prepared by the method of claim 1.

35. A dispersion as set forth in claim 34 wherein the transition metal is manganese.

36. A dispersion as set forth in claim 34 wherein the transition metal is rhenium.

37. A dispersion as set forth in claim 34 having a maximum colloidal transition metal particle size of about 150 Angstrom units.

38. A dispersion as set forth in claim 34 wherein the weight ratio of transition metal to polymer is within the range of from about 90:100 to about 90:10.

* * * * *